US007912134B2

(12) United States Patent
Rengarajan et al.

(10) Patent No.: US 7,912,134 B2
(45) Date of Patent: Mar. 22, 2011

(54) FRAME BUILDING IN THE PRESENCE OF ARQ-ENABLED TRAFFIC

(75) Inventors: Balaji Rengarajan, Hillsboro, OR (US); Muthaiah Venkatachalam, Beaverton, OR (US); Puneet Pandoh, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 987 days.

(21) Appl. No.: 11/491,307

(22) Filed: Jul. 21, 2006

(65) Prior Publication Data

US 2008/0019394 A1    Jan. 24, 2008

(51) Int. Cl.
*H04L 27/00* (2006.01)
(52) U.S. Cl. ......................... 375/259; 375/260
(58) Field of Classification Search .................. 375/259, 375/260; 370/208–210, 319, 344, 347
See application file for complete search history.

(56) References Cited

U.S. PATENT DOCUMENTS

| | | | | |
|---|---|---|---|---|
| 5,594,738 | A | * | 1/1997 | Crisler et al. ................. 370/347 |
| 6,577,641 | B1 | * | 6/2003 | Izumi ............................ 370/442 |
| 7,046,651 | B2 | | 5/2006 | Terry |
| 7,548,507 | B2 | | 6/2009 | Pandoh et al. |
| 2005/0002323 | A1 | | 1/2005 | Hadad |
| 2005/0201269 | A1 | | 9/2005 | Shim et al. |
| 2006/0149915 | A1 | * | 7/2006 | Maly ............................. 711/172 |
| 2006/0182142 | A1 | * | 8/2006 | Schmidt ....................... 370/465 |

FOREIGN PATENT DOCUMENTS

| | | |
|---|---|---|
| WO | 2004/012376 A2 | 2/2004 |
| WO | WO2004/012376 A2 | 2/2004 |
| WO | 2008/011330 A1 | 1/2008 |

OTHER PUBLICATIONS

Method Constructing a Downlink Frame for a Communication System—Inventors: Puneet Pandoh et al.—U.S. Appl. No. 11/395,342, filed Mar. 31, 2006.
International Search Report/ Written Opinion for PCT Patent Application No. PCT/US2007/073369, Mailed Dec. 18, 2007,10 pages.
International Preliminary Report on Patentability for PCT Patent Application No. PCT/US2007/073369, Mailed Jan. 27, 2009, 5 pages.

(Continued)

*Primary Examiner* — Emmanuel Bayard
(74) *Attorney, Agent, or Firm* — Blakely, Sokoloff, Taylor & Zafman LLP

(57) ABSTRACT

When building a sub-frame for a wireless transmission that distributes the data over multiple simultaneous sub-channels, fragmenting the data to fit into the sub-frame may leave wasted space in the sub-frame because the minimum allowable size of the fragments leaves gaps. To increase overall throughput, these gaps may be wholly or partly filled in with another type of data that has smaller minimum size fragments. In some embodiments, the sub-frame may use orthogonal frequency division multiple access (OFDMA) protocols, and the two data types may be classified as automatic repeat request (ARQ)-enabled and non-ARQ-enabled data.

16 Claims, 4 Drawing Sheets

OTHER PUBLICATIONS

"PCT International Search Report and Written Opinion", PCT/US2007/073369, mailed Dec. 18, 2007, 10 pages.

"PCT International Preliminary Report on Patentability and Written Opinion", PCT/US2007/073369, mailed Feb. 5, 2009, 6 pages.

IEEE Standards, IEEE Std 802.16.2-2004, Coexistence of Fixed Broadband Wireless Access Systems, IEEE Computer Society and the IEEE Microwave Theory and Techniques Society, pp. i to 151 (Mar. 17, 2004).

IEEE Standards, IEEE Std 802.16e-2005 and IEEE Std 802.16-2004/Cor1-2005, Part 16: Air Interface for Fixed and Mobile Broadband Wireless Access Systems, Amendment 2: Physical and Medium Access Control Layers for Combined Fixed and Mobile Operation in Licensed Bands and Corrigendium 1, IEEE Computer Society and the IEEE Microwave Theory and Techniques Society, pp. i to 822 (Feb. 28, 2006).

\* cited by examiner

FRAME BUILDING IN THE PRESENCE OF ARQ-ENABLED TRAFFIC

BACKGROUND

Some wireless communications techniques may use Orthogonal Frequency Division Multiple Access (OFDMA). One example may be found in the communications standard defined by the Institute of Electrical and Electronic Engineers standard 802.16 (IEEE 802.16). In this approach to wireless communications, data to be communicated over a channel may be fragmented into multiple segments of various lengths, and those segments distributed among multiple sub-channels operating at different frequencies, which are transmitted at the same time. When those multiple sub-channels are received, the received data may be reconstructed into the original data pattern. To better illustrate the arrangement of these transmissions, they are frequently represented in graphical form, with the sub-channels along one axis and time (usually represented by slots or symbols) along the other axis, forming a rectangular block that represents a sub-frame. Overall throughput of the channel may depend on how fully the sub-frames are packed with data. If a sub-frame to be transmitted has a pre-determined size (e.g., pre-determined number of sub-channels and pre-determined number of slots) and the data can be fragmented at any point, then the data may be fragmented specifically to fit exactly into that predetermined size, resulting in complete usage of the sub-frame. However, if the data may only be fragmented along specific boundaries, the fragments may not fit exactly into the available sub-frame, resulting in wastage (i.e., least one part of the sub-frame doesn't contain any useful data during at least one portion of the transmission).

BRIEF DESCRIPTION OF THE DRAWINGS

Some embodiments of the invention may be understood by referring to the following description and accompanying drawings that are used to illustrate embodiments of the invention. In the drawings.

DETAILED DESCRIPTION

Figure 1:
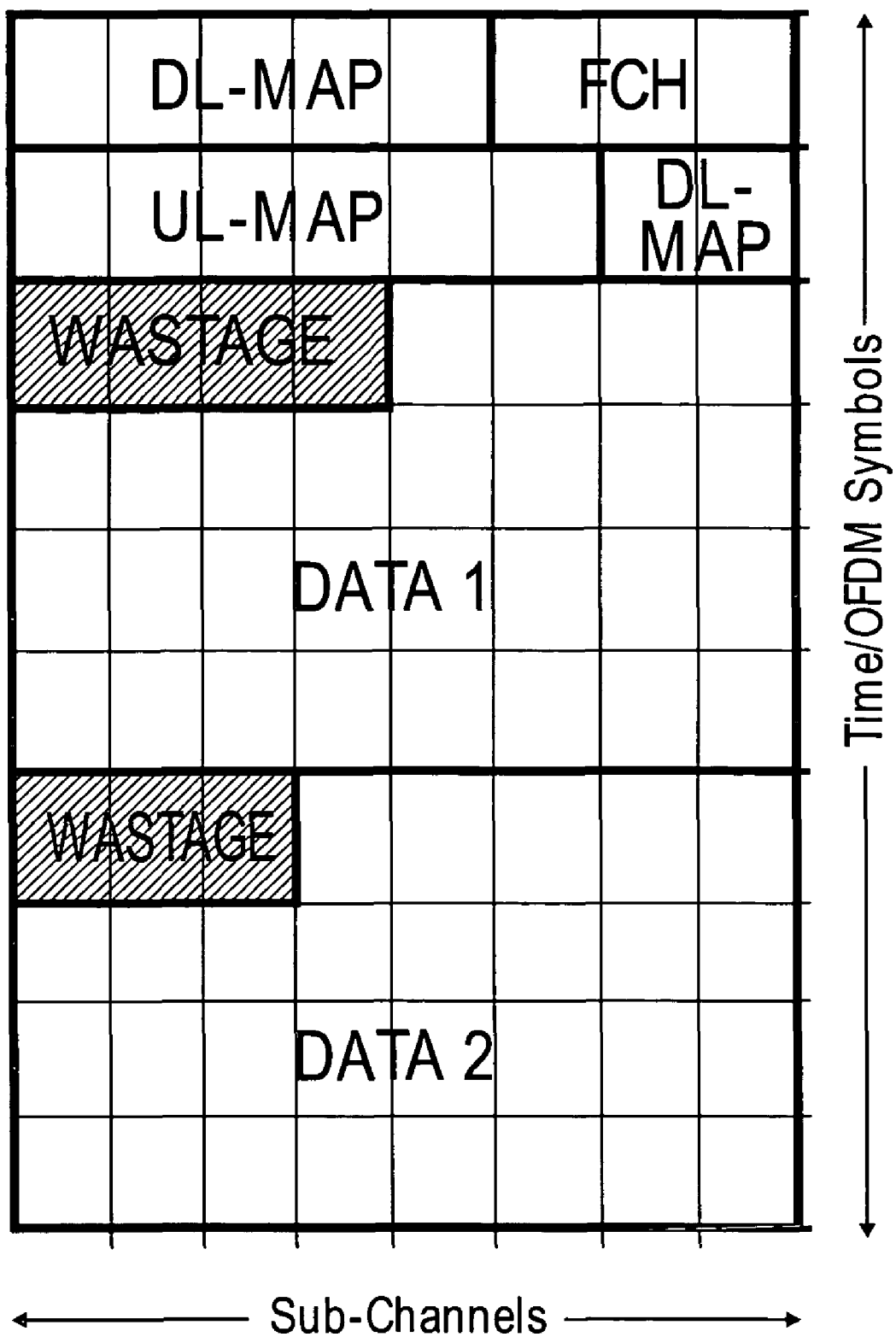
FIG. 1 shows a diagram of a sub-frame containing wastage, according to an embodiment of the invention.

In the following description, numerous specific details are set forth. However, it is understood that embodiments of the invention may be practiced without these specific details. In other instances, well-known circuits, structures and techniques have not been shown in detail in order not to obscure an understanding of this description.

References to "one embodiment", "an embodiment", "example embodiment", "various embodiments", etc., indicate that the embodiment(s) of the invention so described may include particular features, structures, or characteristics, but not every embodiment necessarily includes the particular features, structures, or characteristics. Further, some embodiments may have some, all, or none of the features described for other embodiments.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements co-operate or interact with each other, but they may or may not be in direct physical or electrical contact.

The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The term "mobile wireless device" may be used to describe a wireless device that may be moved while it is communicating.

As used herein, unless otherwise specified the use of the ordinal adjectives "first", "second", "third", etc., to describe a common object, merely indicate that different instances of like elements are being referred to, and are not intended to imply that the elements so described must be in a given sequence, either temporally, spatially, in ranking, or in any other manner.

Various embodiments of the invention may be implemented in one or any combination of hardware, firmware, and software. The invention may also be implemented as instructions contained in or on a machine-readable medium, which may be read and executed by one or more processors to enable performance of the operations described herein. A machine-readable medium may include any mechanism for storing, transmitting, and/or receiving information in a form readable by a machine (e.g., a computer). For example, a machine-readable medium may include a storage medium, such as but not limited to read only memory (ROM); random access memory (RAM); magnetic disk storage media; optical storage media; a flash memory device, etc. A machine-readable medium may also include a propagated signal which has been modulated to encode the instructions, such as but not limited to electromagnetic, optical, or acoustical carrier wave signals.

Various embodiments of the invention may be used in a variety of applications, such as but not limited to wireless devices that transmit wireless signals. Such devices may include, but are not limited to, such things as radiotelephone communication systems, satellite communication systems, two-way radio communication systems, pagers, personal communication systems (PCS), personal digital assistants (PDA's), wireless local area networks (WLAN), personal area networks (PAN), metropolitan area network (MAN), broadband wireless networks and the like.

On a wireless channel the quality of the received signal may vary with time, based on various factors, thereby introducing different error levels at different points in time. This variable quality may be at least partially compensated for by using adaptive modulation and coding (AMC) by which a modulation and coding scheme (MCS) level may be chosen based on the channel quality observed and/or the channel quality desired. In a related area, a WiMAX base station may allocate bandwidth between active service flows such that each flow may meet its quality of service (QoS) requirements. A "service flow" is a term used here to indicate a group of related packets queued up to be sent in one or more frames. By way of example and not by way of limitation, one service flow may involve VoIP (Voice over Internet Protocol) communication data, another flow may involve Internet browsing communication, and other flows may also be simultaneously supported by a communication system.

Some communications techniques may use a protocol in which data that is to be fragmented (i.e., separated into separate data blocks) for simultaneous transmission over multiple sub-channels may only be fragmented at the boundaries between blocks of a defined size. One example is the Automatic Repeat Request (ARQ) protocol defined by the Institute of Electrical and Electronic Engineers (IEEE) standard 802.16, which states, among other things, that ARQ-enabled data may only be fragmented into segments that are integer multiples of a pre-determined ARQ block size, for packing into a sub-frame. If the fragmented data is to be packed into a transmission that is not an integer multiple of ARQ blocks in size, then there may be a time period during the transmission, for example a time period less than one ARQ block in duration, that may not have data in it and is therefore considered wastage.

Various embodiments of the invention may try to improve throughput for ARQ-enabled data traffic using OFDMA techniques, by fragmenting the data along ARQ block boundaries, determining how much wastage is created by that fragmenting, and then filling in some or all of the wasted space with other data traffic that may be fragmented into smaller block sizes. In some embodiments, reaching a threshold value of some related parameter may trigger transmission of the data even if there is still wastage.

FIG. 1 shows a diagram of a sub-frame containing wastage, according to an embodiment of the invention. The illustrated embodiment shows an example using Orthogonal Frequency Division Multiple Access (OFDMA) techniques, but other techniques that involve a similar distribution of transmitted data over multiple parallel channels may also be covered. In the example shown, the data is being transmitted simultaneously over 8 sub-channels (shown along the vertical axis), but other embodiments may use more or fewer than that number of sub-channels. Although the term 'sub-channels' is used here to describe simultaneous transmissions with different center frequencies, embodiments of the invention may include instances in which labels other than 'sub-channel' are used to describe similar phenomena.

Although the descriptions herein may refer to allocating data to particular 'blocks', 'positions', or similar terminology, these descriptions are used as convenient ways to conceptually relate the explanation to the drawings. In actual operation, in some embodiments the data may be contained in buffers or memory locations, and each segment of data may be assigned to a particular place in the sub-frame, without having to physically move that data. References to blocks, positions, etc., are intended to encompass this physical reality.

Continuing with FIG. 1, the horizontal axis may be time-based, in which going from left to right represents the passage of time. In the example shown, each of the ten vertical stripes of the illustrated sub-frame may represent twice the time it takes to transmit an OFDMA symbol, so that the entire diagram shows the time to transmit twenty OFDMA symbols, but other embodiments may include a sub-frame with a length equal to a different number of symbols.

In the example shown, the first two stripes (i.e., the first four OFDMA symbols) include header information that provides a guide to finding specific information in the rest of the sub-frame (or in some embodiments subsequent sub-frames), such as a downlink map (DL-MAP in two separate blocks), an uplink map (UL-MAP), and a frame control header (FCH). Some embodiments may contain more, fewer, and/or different header fields than those shown.

The rest of the sub-frame shows two major blocks of data, labeled DATA 1 and DATA 2, with each major block spanning multiple stripes, with the first major block packed into the third through sixth stripes, and the second major block packed into the seventh through tenth stripes. Although the example shows two major blocks, a sub-frame might include any feasible quantity of one or more such major blocks. Major blocks DATA 1 and DATA 2 each show a sub-block labeled 'Wastage' which represents the amount of potentially usable space in the sub-frame left over after the data has been fragmented along the permitted boundaries and packed into the sub-frame. In some embodiments the permitted boundaries may be defined by the size of ARQ-enabled data blocks. Since ARQ-enabled data may only be fragmented between ARQ blocks, the size of the ARQ-enabled blocks may define the smallest increment of data to be inserted into the sub-frame. If the sub-frame is transmitted in the form shown in FIG. 1, the wastage represents potential throughput that is unused because no useful data is placed there.

For simplicity of example, wastage is shown in only the third and seventh stripes. But in some embodiments more stripes, possibly every stripe, may potentially contain wastage.

Figure 2:
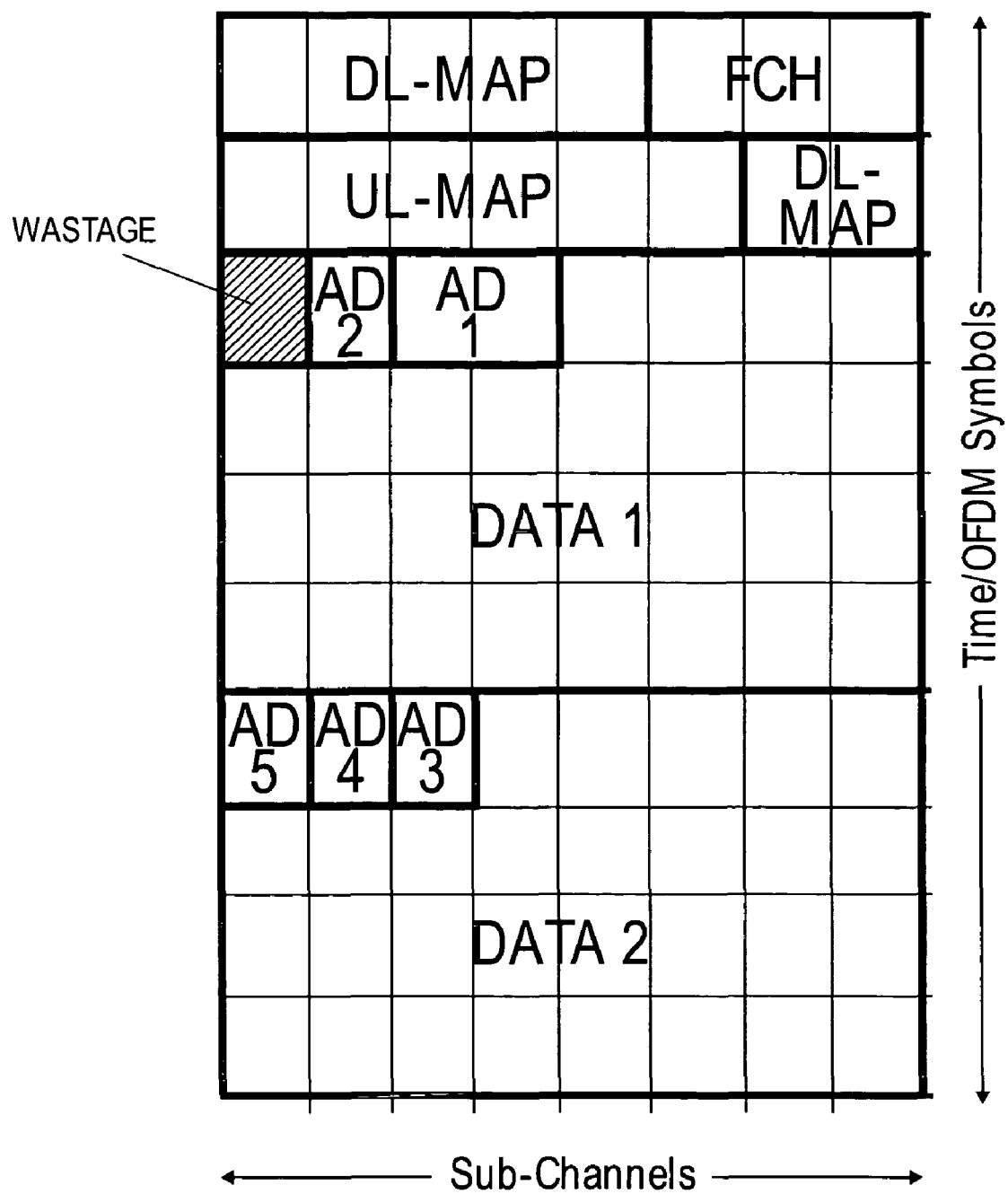
FIG. 2 shows a diagram of a sub-frame containing less wastage than shown in FIG. 1, according to an embodiment of the invention.

FIG. 2 shows a diagram of a sub-frame containing less wastage than shown in FIG. 1, according to an embodiment of the invention. While the data in blocks DATA 1 and DATA 2 may contain ARQ-enabled data, limiting where that data may be fragmented for packing into the sub-frame, some non-ARQ-enabled data may be fragmented into smaller sizes, permitting it to be inserted into the areas labeled as 'wastage' in FIG. 1. This is illustrated in FIG. 2. Additional data, that may be fragmented into smaller blocks than ARQ-enabled data, is shown as AD 1, AD 2, AD 3, AD 4, and AD 5. This additional data may be fragmented into sizes that permit it to fit into the wastage blocks shown in FIG. 1. Even though the additional data may be divided into smaller block sizes, in some instances there may still be some wastage that is smaller than any of the available fragments of data, as shown in the third stripe.

In some embodiments different MCS levels may be used in the same sub-frame, but may be separated into different blocks within the sub-frame (e.g., the DATA 1 block may have a different MCS level than the DATA2 block). Therefore, the ARQ-enabled data and the non-ARQ-enabled data of a single block (e.g., DATA 1 and the Wastage associated with DATA 1) may both use the same MCS level. Procedurally, a group of service flows that each use the same MCS level may be aggregated into an 'MCS bucket', and the service flows within that bucket may be used to populate one or more blocks within a sub-frame. In some embodiments, the service flows within that bucket may be used to populate all the sub-frames of a single frame. Note that with changing channel conditions, the MCS level of a flow may change with time and hence its association to a particular MCS bucket may also change.

Figure 3:
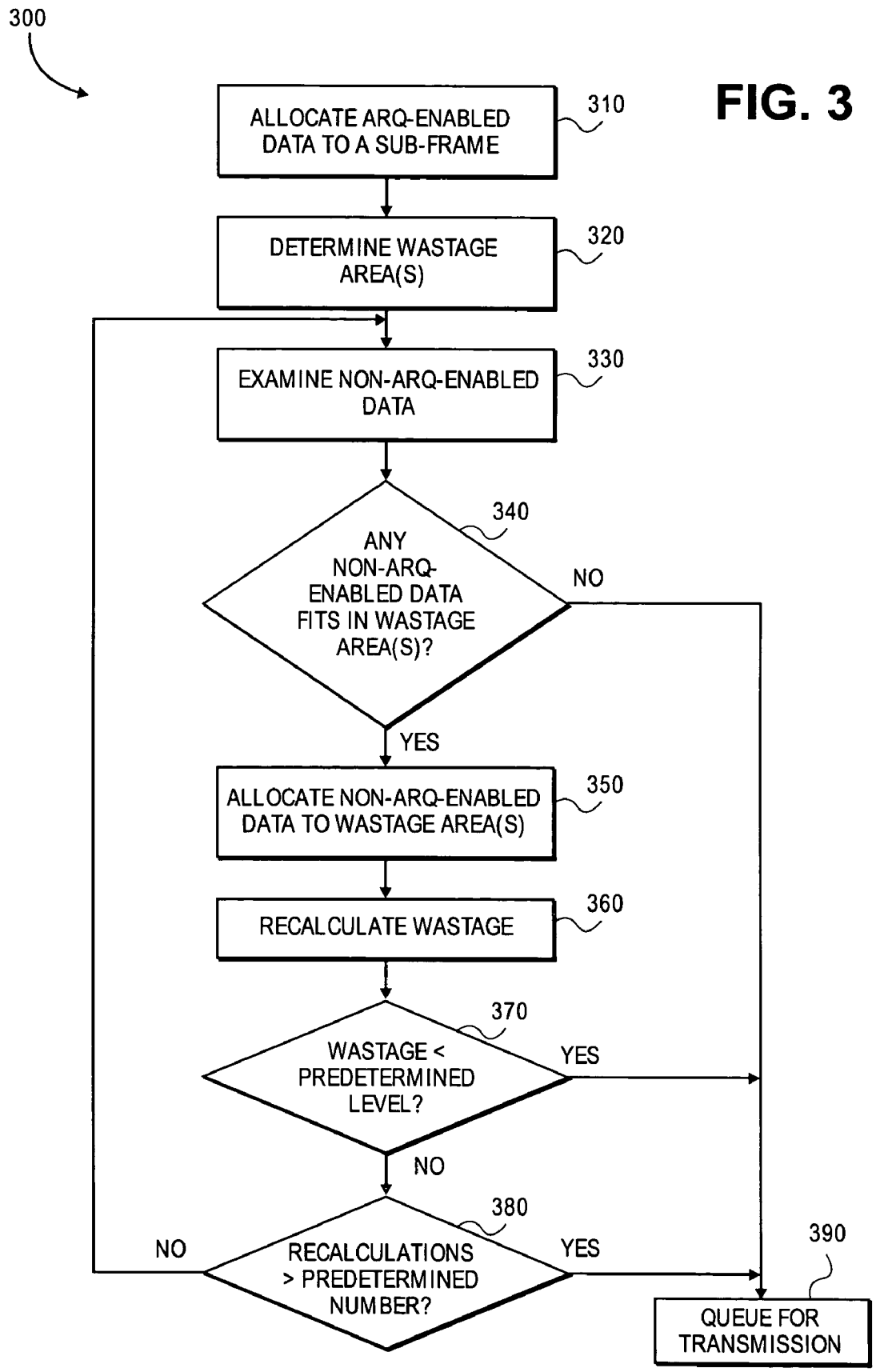
FIG. 3 shows a flow diagram of a method of allocating data to a sub-frame, according to an embodiment of the invention.

FIG. 3 shows a flow diagram of a method of allocating data to a sub-frame, according to an embodiment of the invention. In some embodiments, all the data (possibly excluding link maps and other header information) allocated to the sub-frame of this example may come from the same MCS bucket. The dimensions of the sub-frame (e.g., the number of sub-channels and the number of stripes) may have been pre-determined through any feasible means. In flow diagram 300, ARQ-enabled data may be allocated to the sub-frame by fragmenting the data to fit into the dimensions of the sub-frame. In some embodiments, the allocation of 310 may continue until no remaining ARQ-enabled data is able to fit into the remaining space of the sub-frame. In other embodiments, the allocation of 310 may stop short of that level, purposefully leaving extra space. In either case, wastage may be determined at 320 by determining how much of the sub-frame does not have data allocated to it. The wastage may be located in one or more areas of the sub-frame.

At 330, non-ARQ-enabled data from the same MCS bucket as the ARQ-enabled data may be examined for various characteristics, such as the smallest feasible fragmentation blocks into which it may be divided. At 340, the size of the wastage areas may be compared with the examined non-ARQ-enabled data to determine which parts of that data may fit into the available wastage. If there is no such data that will fit, the sub-frame may be queued for transmission at 390, and may be subsequently transmitted. In an alternate embodiment (not illustrated), if there is no such data that will fit, the system may wait for up to a predefined time to determine if more non-ARQ-enabled data becomes available, and then try the comparison at 340 again.

If data is found at 340 that will fit into the wastage area(s), that data may be allocated to the wastage area(s) at 350. Wastage may then be recalculated at 360 to determine the new (and smaller) wastage area(s). In some embodiments operations 330 through 360 may then be repeated in an attempt to try to reduce wastage even further. However, repeating this loop too many times might be inefficient or cause undue delays in transmitting the data. Therefore, if wastage has been reduced below some predetermined level as determined at 370, or if the loop 330 through 360 has been repeated some predetermined number of times as determined at 380, the sub-frame may be placed into a queue for transmission at 390, and subsequently transmitted.

Figure 4:
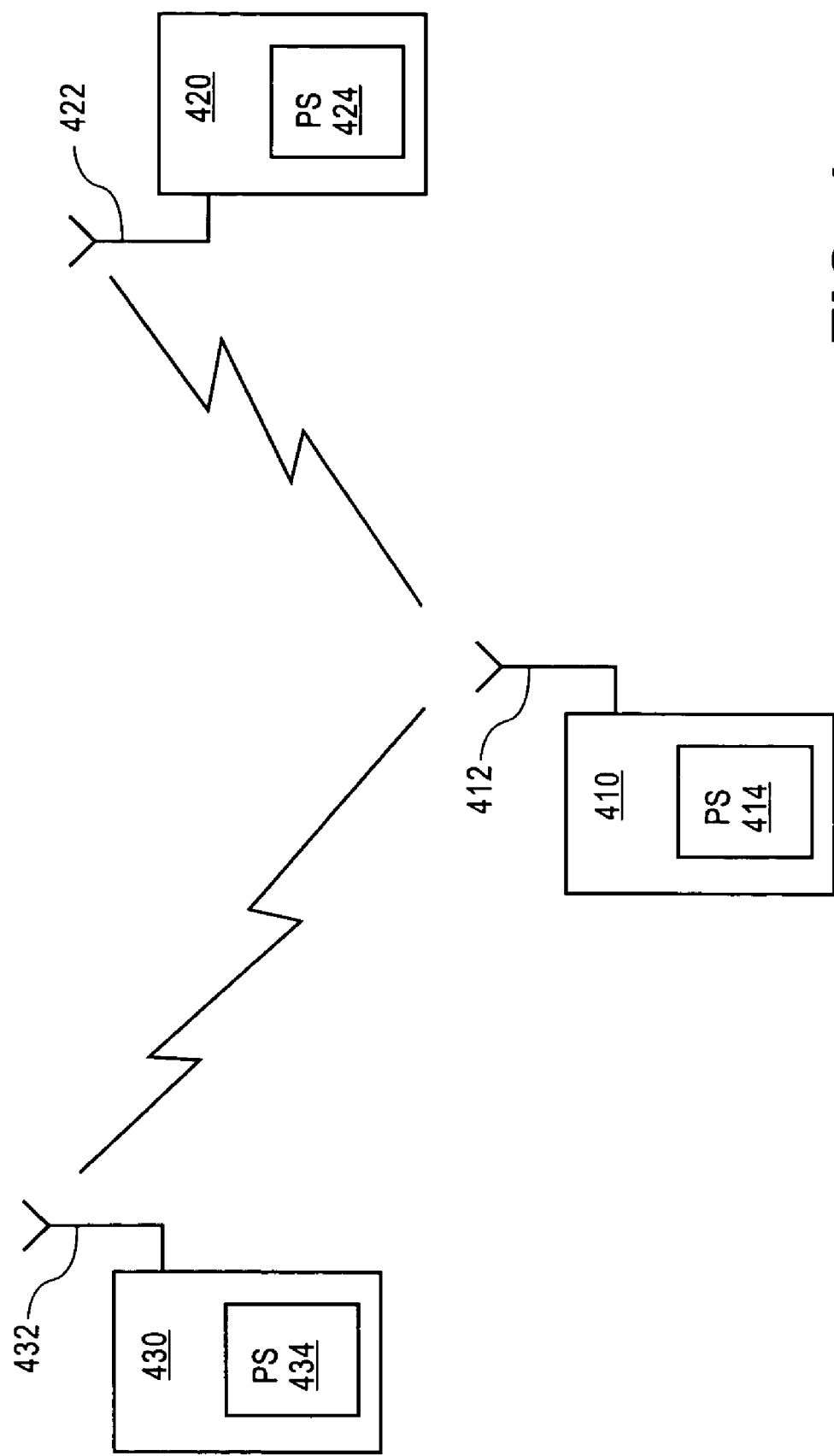
FIG. 4 shows a network of devices, according to an embodiment of the invention.

FIG. 4 shows a network of devices, according to an embodiment of the invention. A central communications device 410 (e.g., an access point or a base station) may communicate wirelessly with mobile communications devices 420 and 430. Each device may have one or more antennas (412, 422, 432, respectively), and a power supply (414, 424, 434, respectively). In some embodiments the power supply (424, 434) of each mobile communications device (420, 430) may be a battery, while the power supply (414) of the central communications device (410) may be connected to a fixed alternating-current electrical source, but other embodiments may use other techniques (e.g., using a battery to power the central communications device). In some embodiments the sub-frame allocation techniques previously described may be used in the central communications device 410 to construct downlink transmissions, since the central communications device 410 is likely to have more computing power than the mobile devices. In other embodiments, the mobile communications devices may use those sub-frame assembly techniques.

Much of the foregoing text has described building sub-frames using ARQ-enabled data with minimum block sizes for fragmentation and non-ARQ-enabled data with smaller minimum block size for fragmentation. However, in other embodiments the same techniques may be used for any two types of data in which one data type has smaller minimum block sizes for fragmentation than does the other data type.

The foregoing text has described building sub-frames for a transmission that will use OFDMA techniques. However, in other embodiments the same approach may be used for transmission using other types of techniques involving the simultaneous transmission of related data over multiple frequencies, in which fragmentation is used to fit the data to the sub-frame.

The foregoing description is intended to be illustrative and not limiting. Variations will occur to those of skill in the art. Those variations are intended to be included in the various embodiments of the invention, which are limited only by the spirit and scope of the following claims.

What is claimed is:

1. A method, comprising
organizing, by a processing device, first and second types of data for wireless transmission over multiple sub-channels transmitting simultaneously, wherein the first type of data may be fragmented into minimum block sizes of a first size, and the second type of data may be fragmented into minimum block sizes of a second size smaller than the first size, wherein said organizing comprises:
allocating data of the first type to fit into available positions in the transmission; and
allocating data of the second type to fit into positions in the transmission that remain after said allocating the data of the first type.

2. The method of claim 1, wherein the wireless transmission comprises orthogonal frequency division multiple access transmission.

3. The method of claim 1, wherein the positions in the transmission comprise positions in a sub-frame.

4. The method of claim 1, wherein the data of the first type comprises data conforming to Automatic Repeat Request enabled (ARQ-enabled) requirements, and the data of the second type comprises data conforming to non-ARQ-enabled requirements.

5. The method of claim 1, wherein said allocating data of the second type comprises multiple iterations of allocating data of the second type to the remaining positions in the transmission.

6. A machine readable storage medium providing instructions which when executed by a data processing system cause the data processing system to perform a method of processing data, the method comprising:
organizing, by a processing device, first and second types of data for wireless transmission over multiple sub-channels transmitting simultaneously, wherein the first type of data may be fragmented into minimum block sizes of a first size, and the second type of data may be fragmented into minimum block sizes of a second size smaller than the first size, wherein said organizing comprises:
allocating data of the first type to fit into available positions in the transmission; and
allocating data of the second type to fit into positions in the transmission that remain after allocating the data of the first type.

7. The machine readable storage medium of claim 6, wherein the operation of organizing comprises an operation of organizing the first and second types of data into a format for an orthogonal frequency division multiple access transmission.

8. The machine readable storage medium of claim 6, wherein the positions in the transmission comprise positions in a sub-frame.

9. The machine readable storage medium of claim 6, wherein the data of the first type comprises data conforming to Automatic Repeat Request enabled (ARQ-enabled) requirements, and the data of the second type comprises data conforming to non-ARQ-enabled requirements.

10. The machine readable storage medium of claim 6, wherein the operation of allocating data of the second type comprises multiple iterations of allocating data of the second type to remaining positions in the transmission.

11. The machine readable storage medium of claim 10, further comprising stopping said multiple iterations and transmitting the allocated data upon occurrence of: 1) performing a predetermined number of the iterations, or 2) reducing unallocated space in the transmission below a predetermined amount.

12. A system, comprising:
a wireless communications device including a battery to power operations of the wireless communications device, wherein the wireless communications device is to:
fragment data for allocation in a sub-frame for transmission over multiple sub-channels, the data comprising first data which may be fragmented into multiples of a first minimum block size and second data which may be fragmented into multiples of a second minimum block size smaller than the first minimum block size;
allocate at least some fragments of the first data to available positions in the sub-frame; and
allocate at least some fragments of the second data to positions in the sub-frame still available after said allocating fragments of the first data.

13. The system of claim 12, wherein the wireless communications device comprises a mobile wireless communications device.

14. The system of claim 12, wherein the wireless communications device comprises an access point.

15. The system of claim 12, wherein the sub-frame comprises a sub-frame for transmission using orthogonal frequency division multiple access techniques.

16. The system of claim 15, wherein the first minimum block size is to be defined for automatic repeat request (ARQ)-enabled data, and the second minimum block size is to be defined for non-ARQ-enabled data.

* * * * *